US010099266B2

(12) United States Patent
Ehmann et al.

(10) Patent No.: US 10,099,266 B2
(45) Date of Patent: Oct. 16, 2018

(54) TRANSPORTING APPARATUS FOR ROLLING INGOTS, USE OF SUCH A TRANSPORTING APPARATUS, AND METHOD FOR TRANSPORTING ROLLING INGOTS

(71) Applicant: GAUTSCHI ENGINEERING GMBH, Tägerwilen (CH)

(72) Inventors: Rainer Ehmann, Bodman-Ludwigshafen (DE); Jochen Brackmeyer, Bodman-Ludwigshafen (DE)

(73) Assignee: GAUTSCHI ENGINEERING GMBH, Tägerwilen (CH)

( * ) Notice: Subject to any disclaimer, the term of this patent is extended or adjusted under 35 U.S.C. 154(b) by 274 days.

(21) Appl. No.: 14/897,852

(22) PCT Filed: Jun. 4, 2014

(86) PCT No.: PCT/EP2014/061556

§ 371 (c)(1),
(2) Date: Dec. 11, 2015

(87) PCT Pub. No.: WO2014/198600

PCT Pub. Date: Dec. 18, 2014

(65) Prior Publication Data

US 2016/0193639 A1 Jul. 7, 2016

(30) Foreign Application Priority Data

Jun. 11, 2013 (DE) ........................ 10 2013 106 024

(51) Int. Cl.

| | |
|---|---|
| ***B65G 25/00*** | (2006.01) |
| ***B21B 39/22*** | (2006.01) |
| ***C21D 9/00*** | (2006.01) |
| ***F27B 9/38*** | (2006.01) |
| ***F27D 3/06*** | (2006.01) |

(Continued)

(52) U.S. Cl.

CPC .......... *B21B 39/226* (2013.01); *C21D 9/0018* (2013.01); *F27B 9/38* (2013.01);

(Continued)

(58) Field of Classification Search

CPC ................................................ F27D 2003/008

USPC .................. 414/147, 191, 192, 216; 266/45; 198/373

See application file for complete search history.

(56) References Cited

U.S. PATENT DOCUMENTS 4,360,304 A * 11/1982 Brewer .................. B66C 11/00 212/270

4,938,690 A 7/1990 Thomlinson et al.

FOREIGN PATENT DOCUMENTS

CN 2810794 Y 8/2006
CN 201177457 Y 1/2009

(Continued)

OTHER PUBLICATIONS

Office Action dated Dec. 13, 2016 by the State Intellectual Property Office of China in related Chinese patent application 2014800390000.0, translation provided.

(Continued)

*Primary Examiner* — Saul Rodriguez

(74) *Attorney, Agent, or Firm* — Hassan Abbas Shakir; Katten Muchin Rosenman LLP

(57) ABSTRACT

A transporting apparatus for rolling ingots, having at least one travelling carriage, includes a tilting frame and a guide frame, wherein the tilting frame has at least one longitudinally displaceable transporting carriage with a rail section, which is intended for accommodating an ingot rest and, for the purpose of forming a rail extension, can be positioned collinearly in relation to a furnace rail, and the guide frame has at least one hook carriage, which can be moved essentially parallel to the transporting carriage and comprises at least one tiltable hook for engaging in the ingot rest.

20 Claims, 14 Drawing Sheets

(51) Int. Cl.
*F27D 3/00* (2006.01)
*F27D 3/12* (2006.01)

(52) U.S. Cl.
CPC ............. *F27D 3/06* (2013.01); *C21D 9/0081* (2013.01); *F27B 2009/382* (2013.01); *F27B 2009/384* (2013.01); *F27D 2003/0046* (2013.01); *F27D 2003/0051* (2013.01); *F27D 2003/0062* (2013.01); *F27D 2003/125* (2013.01); *F27D 2003/126* (2013.01)

(56) References Cited

FOREIGN PATENT DOCUMENTS

| | | | |
|---|---|---|---|
| CN | 201755590 | U | 3/2011 |
| CN | 201915127 | U | 8/2011 |
| CN | 201915128 | U | 8/2011 |
| DE | 477441 | C | 6/1929 |
| EP | 0426576 | A1 | 5/1991 |
| JP | 2003226912 | A | 8/2003 |

OTHER PUBLICATIONS

International Search Report (English and German) dated of Oct. 1, 2014.

Office Action dated Mar. 23, 2014 by the German Patent Office in related application 10 2013 106 024.2, partial machine translation provided.

International Preliminary Report on Patentability and Written Opinion of the International Searching Authority dated Oct. 1, 2014 for parent application PCT/EP2014/061556, translation provided.

* cited by examiner

TRANSPORTING APPARATUS FOR ROLLING INGOTS, USE OF SUCH A TRANSPORTING APPARATUS, AND METHOD FOR TRANSPORTING ROLLING INGOTS

BACKGROUND OF THE INVENTION

1. Field of the Invention

The invention relates to a transporting apparatus for rolling ingots, in particular aluminum rolling ingots, to the use of such a transporting apparatus and to a method for transporting rolling ingots.

2. Discussion of the Related Art

In the industrial production of aluminum semifinished products, the aluminum in the form of rolling ingots is first of all subjected to a heat treatment in order subsequently to be converted in a rolling mill into the desired sheet metal shape. The heat treatment leads to heating and homogenizing of the aluminum, which facilitates the rolling process and increases the quality of the semifinished product produced.

It is known to use ingot pusher furnaces for heating and homogenizing aluminum rolling ingots. Furnaces of this type are stationary and in each case comprise an inlet side and an outlet side. Rails are attached in between in the longitudinal direction within the furnace. Ingot pusher furnaces customarily comprise two rails which serve as a guide for ingot rests. The ingot rests are produced from cast iron and are sufficiently heat-resistant to ensure dimensional stability within the heated-up ingot pusher furnace. The rolling ingots to be heated are deposited on said rests and moved through the furnace. Continuous heating of rolling ingots is thereby possible.

The ingot pusher furnace is charged via a roller table on which the rolling ingots are brought up to the furnace. The roller table is positioned at right angles to the furnace. A charging apparatus, also called "up-ender", picks up a respective ingot from the roller table and deposits said ingot onto the ingot rests. As soon as the furnace inlet door is opened, the ingot rests together with the rolling ingot are pushed into the furnace. The continuous pushing of ingot rests into the furnace causes the ingot rests and rolling ingots to be pushed through the furnace.

On the outlet side, the ingot rests with the rolling ingot placed thereon are pulled out of the furnace by a pull-out apparatus. A tipping apparatus, also called "down-ender", deposits the heated-up rolling ingot onto a roller table of the rolling mill.

Both the up-ender and the down-ender are securely anchored on the factory floor foundations on the inlet side and outlet side of the ingot pusher furnace. This means that each up-ender or down-ender is in each case assigned to an ingot pusher furnace. It has turned out in practice that the fixed assignment of a pull-out apparatus or tilting apparatus to an ingot pusher furnace leads to an unfavorable utilization of the pull-out or tilting apparatus. Due to the waiting times which are caused by the rolling ingots only being discharged from the ingot pusher furnace intermittently, the pull-out or tilting apparatus is shut down for relatively long periods. At the same time, when a plurality of pusher ingot furnaces are used, a dedicated pull-out or tilting apparatus is required for each ingot pusher furnace, which leads to higher investment and maintenance costs.

SUMMARY OF THE INVENTION

It is the object of the invention to specify a transporting apparatus for rolling ingots, which permits improved utilization and by means of which the investment and maintenance costs of a production system for rolled products are reduced. The invention is furthermore based on the object of specifying the use of such a transporting apparatus and a method for transporting rolling ingots.

The invention is based on the concept of specifying a transporting apparatus for rolling ingots, comprising at least one traveling carriage. The traveling carriage comprises a tilting frame and a guide frame. The tilting frame has at least one longitudinally displaceably movable transporting apparatus which comprises at least one rail section for receiving an ingot rest. The rail section, in order to form a rail extension, is positionable collinearly with respect to a furnace rail. The guide frame has at least one hook carriage which is movable substantially parallel to the transporting carriage. The hook carriage comprises at least one tiltable hook for engaging in the ingot rest.

The invention has a plurality of advantages. Firstly, the traveling carriage enables the transporting apparatus to be assigned to a plurality of furnaces, in particular ingot pusher furnaces. The investment and maintenance outlay for production systems for producing rolled products is thereby reduced. At the same time, the utilization of the transporting apparatus is increased, i.e. the shutdown periods known from the prior art during the transporting of rolling ingots from the furnaces to the rolling mill are reduced, and therefore an efficient operation of the transporting apparatus and of the entire production system is ensured. Secondly, the construction according to the invention enables a pull-out apparatus, namely the hook carriage, to be combined with the transporting carriage. The transporting apparatus according to the invention therefore combines both the function of pulling the rolling ingot out of the ingot pusher furnace and the function of further transport of the rolling ingot to the rolling mill. The technically complicated transferring, known from the prior art, of the rolling ingot from the pull-out apparatus to a tilting apparatus is simplified by the transporting apparatus according to the invention.

The transporting carriage is preferably movable transversely, in particular at right angles, with respect to a direction of movement of the traveling carriage. This permits a simple and efficient use of the transporting apparatus for picking up rolling ingots from a plurality of ingot pusher furnaces and transferring the rolling ingots to a common rolling mill. If the ingot pusher furnaces are arranged parallel to one another, movement of the traveling carriage and the transporting carriage, which is displaceable transversely with respect thereto, enable the transporting apparatus to be rapidly positioned in front of the ingot pusher furnace, which releases the next rolling ingot.

In a preferred embodiment of the transporting apparatus according to the invention, the tilting frame comprises a tilting axis which is arranged parallel to a direction of movement of the traveling carriage. This arrangement of the tilting axis facilitates the transfer of the rolling ingot from the transporting carriage to a rolling mill or a tilting apparatus.

In a further preferred embodiment of the transporting apparatus according to the invention, the guide frame is height-adjustable. The height-adjustability of the guide frame facilitates the handling and control of the transporting apparatus. In particular, the height-adjustability of the guide frame enables the hook carriage to be lowered or raised, preferably in relation to the transporting carriage. The hook carriage can therefore be lowered with the aid of the height-adjustable guide frame in order, for example, to create space for a tilting apparatus which takes over the heated-up rolling ingot from the transporting carriage.

The hook carriage and/or the transporting carriage preferably each have an electric drive, in particular a belt drive. This does not exclude the hook carriage and/or the transporting carriage being actuated electrohydraulically. The electric actuation is expedient in particular for a simple and process-optimized control of the transporting apparatus.

According to a further preferred embodiment of the transporting apparatus according to the invention, the traveling carriage is movable on running rails which are arranged transversely, in particular at right angles, with respect to a furnace pass-through direction. The combination of the traveling carriage with running rails, which are preferably mounted fixedly on a factory floor or on foundations, firstly has advantages in respect of the energy efficiency of the transporting apparatus and secondly is beneficial regarding a relatively low outlay on maintenance and repair. Furthermore, the rail-mounted traveling carriage enables the rolling ingots to be transported securely and uniformly.

The traveling carriage can comprise two tilting frames which are arranged on either side of the guide frame and each have a transporting carriage. In a particularly preferred manner, the two tilting frames are activatable synchronously to each other.

The at least two transporting carriages are preferably movable synchronously to each other. The synchronously movable transporting carriages ensure that the rolling ingot is taken over securely and uniformly from the ingot pusher furnace. In this case, the transporting carriages can be brought up to the ingot pusher furnace in such a manner that the rail sections bear against the furnace rails within the ingot pusher furnace and therefore form an extension of the furnace rails. The ingot rests can thereby be transferred in a simple manner from the ingot pusher furnace to the transporting carriage.

The transfer of the rolling ingot from the ingot pusher furnace to the transporting carriage is facilitated in particular by the guide frame preferably having a longitudinal guide for the hook carriage, which longitudinal guide extends parallel between the at least two transporting carriages. The hook carriage is therefore movable in parallel between the transporting carriages. This arrangement makes it possible for the hook carriage to reach through the transporting carriages such that the hook of the hook carriage can simply and efficiently grasp the ingot rests with the rolling ingots resting thereon in the ingot pusher furnace and pull same onto the rail section of the transporting carriage. Furthermore, the longitudinal guide for the hook carriage, which longitudinal guide is arranged between the transporting carriage and tilting frame, makes it possible for the transporting apparatus to have a compact construction.

The guide frame can comprise a lifter which is height-adjustable with respect to the guide frame. The lifter interacts with a lever arm of the hook in such a manner that the hook is tiltable about an axis of rotation which is arranged in particular transversely, preferably at right angles, with respect to the direction of movement of the hook carriage. The lifter permits simple and reliable actuation of the tiltable hook. In particular, the hook is released from the ingot rest preferably by means of the lifter which therefore forms a particularly simple and maintenance-friendly release mechanism.

In a further preferred refinement of the transporting apparatus according to the invention, it is provided that at least the tilting frame, in particular the transporting carriage, and/or at least the guide frame, in particular the hook carriage, comprises at least one heat and/or spurt protection shield. Heat and/or spurt protection shields of this type have a positive effect on the service life of the apparatus, which is exposed to an increased thermal loading due to the proximity of the furnace output side. The operational reliability of the apparatus is therefore increased.

According to a further independent aspect, the invention is based on the concept of specifying the use of the above-described transporting apparatus for transporting rolling ingots, in particular aluminum rolling ingots, between one or more ingot pusher furnaces and a tilting apparatus.

A further independent aspect of the invention relates to a method for transporting rolling ingots between one or more furnaces and a rolling mill, which method comprises the following steps:

providing an above-described transporting apparatus;

extending at least one furnace rail, wherein the rail section of the transporting carriage is positioned collinearly and flush to the furnace rail;

actuating the hook carriage in such a manner that the hook grasps an ingot rest and moves the latter onto the rail section of the transporting carriage;

displacing the transporting carriage longitudinally and tilting the tilting frame in order to transfer the rolling ingot onto a tilting apparatus.

A further method step preferably comprises actuating the hook carriage for transferring the ingot rest to an ingot rest return.

The advantages and effects mentioned in conjunction with the transporting apparatus apply correspondingly to the method according to the invention for transporting rolling ingots.

BRIEF DESCRIPTION OF THE DRAWINGS

The invention is explained in more detail below using exemplary embodiments with reference to the attached, schematic drawings, in which.

DETAILED DESCRIPTION OF THE INVENTION

Figure 1:
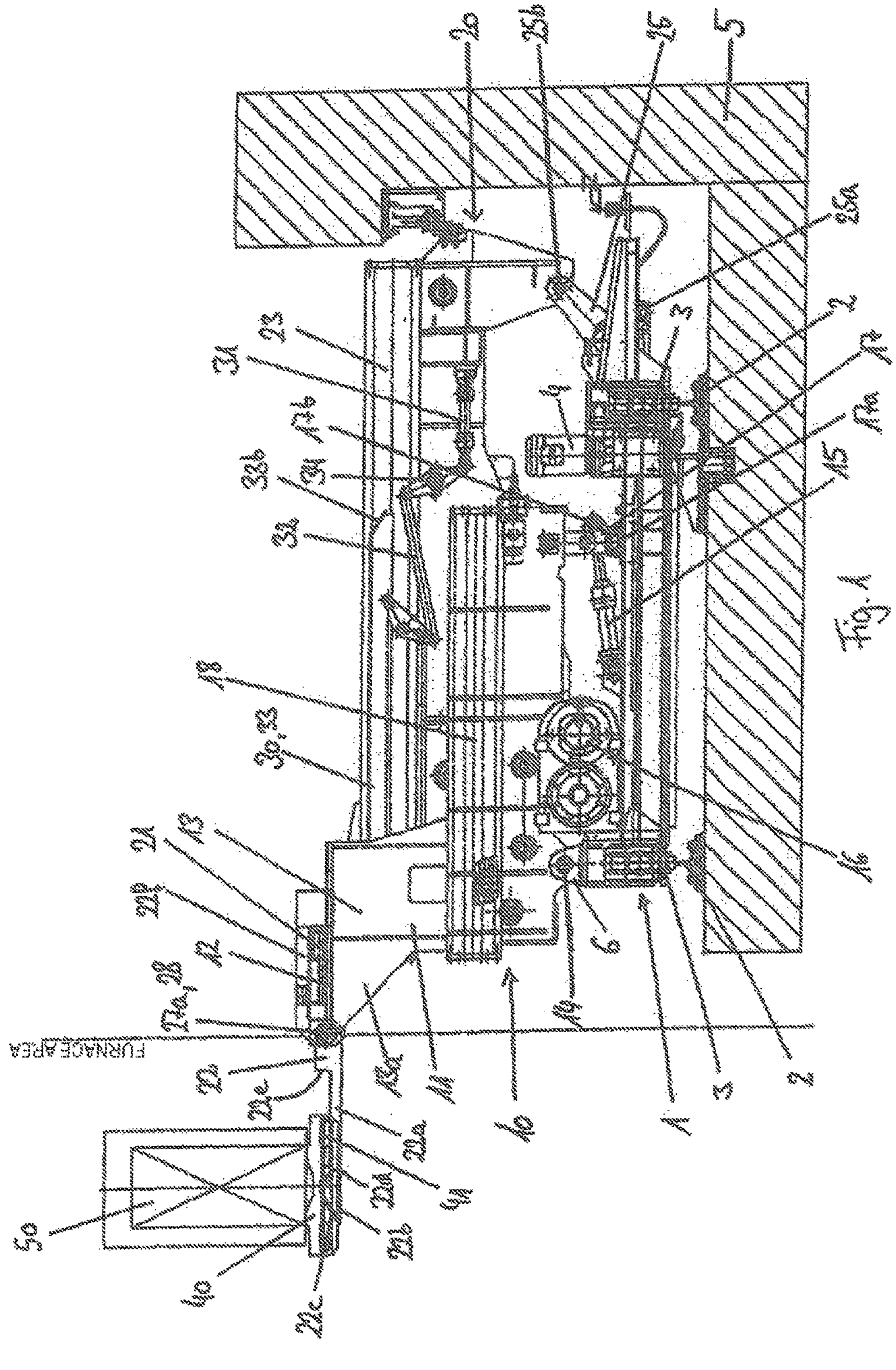
FIG. 1: shows a side view of a transporting apparatus according to an exemplary embodiment according to the invention.

As illustrated in the side view according to FIG. 1, the transporting apparatus or the ingot carriage has a traveling carriage 1 with a tilting frame 10 and a guide frame 20. The traveling carriage 1 is rail-mounted. Specifically, two running rails 2 which are fixedly connected, in particular bolted, to a foundation 5 are provided below the traveling carriage 1. The running rails 2 are oriented transversely with respect to an ingot pusher furnace (not illustrated) such that the traveling carriage 1 is positionable in front of the outputs of different ingot pusher furnaces, which can be arranged parallel to one another. The furnace output side or the furnace region is illustrated in the figures as a chain-dotted line. It can be seen that the traveling carriage 1 is at any rate arranged outside the furnace region. The traveling carriage 1 furthermore comprises a plurality of drive units, in particular a travel drive 4 for the traveling carriage 1, a tilting drive 15 for the tilting frame 10, a raising drive 24 (FIG. 2) for the guide frame 20, a hook drive 29*e* (FIG. 2) for a hook carriage 21 of the guide frame 20, and a transporting drive 16 for a transporting carriage 11 of the tilting frame 10. The travel drive 4 is coupled to at least one wheel 3 of the traveling carriage. The travel drive 4 therefore interacts via the wheel 3 with the running rail 2 for advancing the traveling carriage 1. The travel drive 4 is preferably designed as an electric drive, in particular as an electric motor.

The traveling carriage 1 furthermore bears the tilting frame 10. For this purpose, the traveling carriage 1 has a tilting axis bearing 6 which is arranged in the region of, or specifically above, the wheel 3 of the traveling carriage 1. A tilting axis 14 of the tilting frame 10 is mounted hingedly in the tilting axis bearing 6. The tilting axis 14 is preferably oriented parallel to the running rail 2 closer to the furnace or to the wheel 3 closer to the furnace, wherein the tilting axis 14 is arranged vertically above the running rail 2 closer to the furnace or the wheel 3, which is closer to the furnace, of the traveling carriage 1. At a distance from the tilting axis 14, the tilting frame 10 is hingedly connected to a tilting joint 17. The tilting joint 17 is furthermore coupled to the traveling carriage 1 via a first rotary joint 17*a*. A second rotary joint 17*b* connects the tilting joint 17 to the tilting drive 15, which is hingedly coupled to the traveling carriage 1. The tilting drive 15 comprises a translatory drive, for example a linear drive or a lifting cylinder. In particular, the tilting drive 15 can comprise a hydraulic cylinder. It is also possible for the tilting drive 15 to have a spindle drive or a rack drive. It is advantageous for a compact construction if, as illustrated in FIG. 1, the tilting drive 15 is completely arranged below the tilting frame 10.

The tilting frame 10 furthermore comprises a transporting carriage guide 18 which extends in the longitudinal direction of the tilting frame 10, i.e. substantially at right angles to the tilting axis 14. The transporting carriage guide 18 can comprise a rail guide, for example. The transporting carriage 11 is mounted in a longitudinally displaceable manner in the transporting carriage guide 18. The transporting carriage 11 is therefore movable in the longitudinal direction of the tilting frame 10. For this purpose, the transporting carriage 11 preferably has guide rollers (not illustrated) which engage in the transporting carriage guide 18.

The transporting carriage 11 comprises at least one rail member 13. The transporting carriage 11 preferably has two rail members 13, as can be seen from the front view according to FIG. 3. The rail member 13 has an overhang 13*a* with respect to the furnace side or in the direction of the furnace region, which overhang protrudes over the tilting frame 10 when the transporting carriage 11 is moved into the front end position. The front end position is formed here by the position in which the transporting carriage 11 is closest to the furnace or furnace region or projects into the furnace. The transporting carriage 11 here is arranged substantially vertically above the tilting axis 14. A rail section 12 which extends substantially horizontally over the entire length of the rail member 13 is arranged above the rail member 13. The rail member 13 and the rail section 12 are preferably fixedly connected, in particular welded, or are formed integrally. If, as provided in the present exemplary embodiment, two rail members 13 carry the rail section 12, it is particularly preferred if the rail members 13 substantially form an I-member-like profile with the rail section. It is also possible for a single rail member 13 to form a simple T-member-like profile with the rail section 12.

The traveling carriage 1 furthermore carries the guide frame 20, wherein the guide frame 20 is coupled in an articulated manner via at least one, in particular two, in particular three, in particular four, raising joints 25. The raising joints 25 are preferably arranged spaced apart from one another, wherein, in the case of four raising joints 25, two raising joints 25 in each case preferably form a pair of raising joints. The raising joints 25 or pairs of raising joints are arranged spaced apart from one another in the longitudinal direction of the guide frame 20 in order to ensure an axially correct lifting or lowering of the guide frame 20. At least one raising joint 25 or a pair of raising joints is connected to a raising drive 24. The pair of raising joints further away from the furnace preferably has two raising joints 25 which are each coupled to a raising drive 24. The raising drive 24 can be designed analogously to the tilting drive 15 as a translatory drive. For example, the raising drive 24 can comprise a linear motor, in particular a lifting cylinder, especially a hydraulic cylinder. The raising drive 24 is in each case coupled in a hinged manner to the traveling carriage 1 and to the raising joint 25. The raising joint 25 is likewise coupled in a hinged manner to the traveling carriage 1 by a third rotary joint 25*a* and to the guide frame 20 by a fourth rotary joint 25*b*.

The guide frame 20 comprises a longitudinal guide 23 which can be designed, for example, as a rail guide or roller guide. A hook carriage 21 is guided in a longitudinally displaceable manner in the longitudinal guide 23. The hook carriage 21 preferably has guide rollers (not illustrated) which interact with the longitudinal guide 23 in such a manner that the hook carriage 21 is movable, in particular can travel, along the longitudinal guide 23 of the guide frame 20. As can readily be seen in FIG. 3, the longitudinal guide 23 is arranged substantially centrally between two transporting carriages 11.

Figure 3:
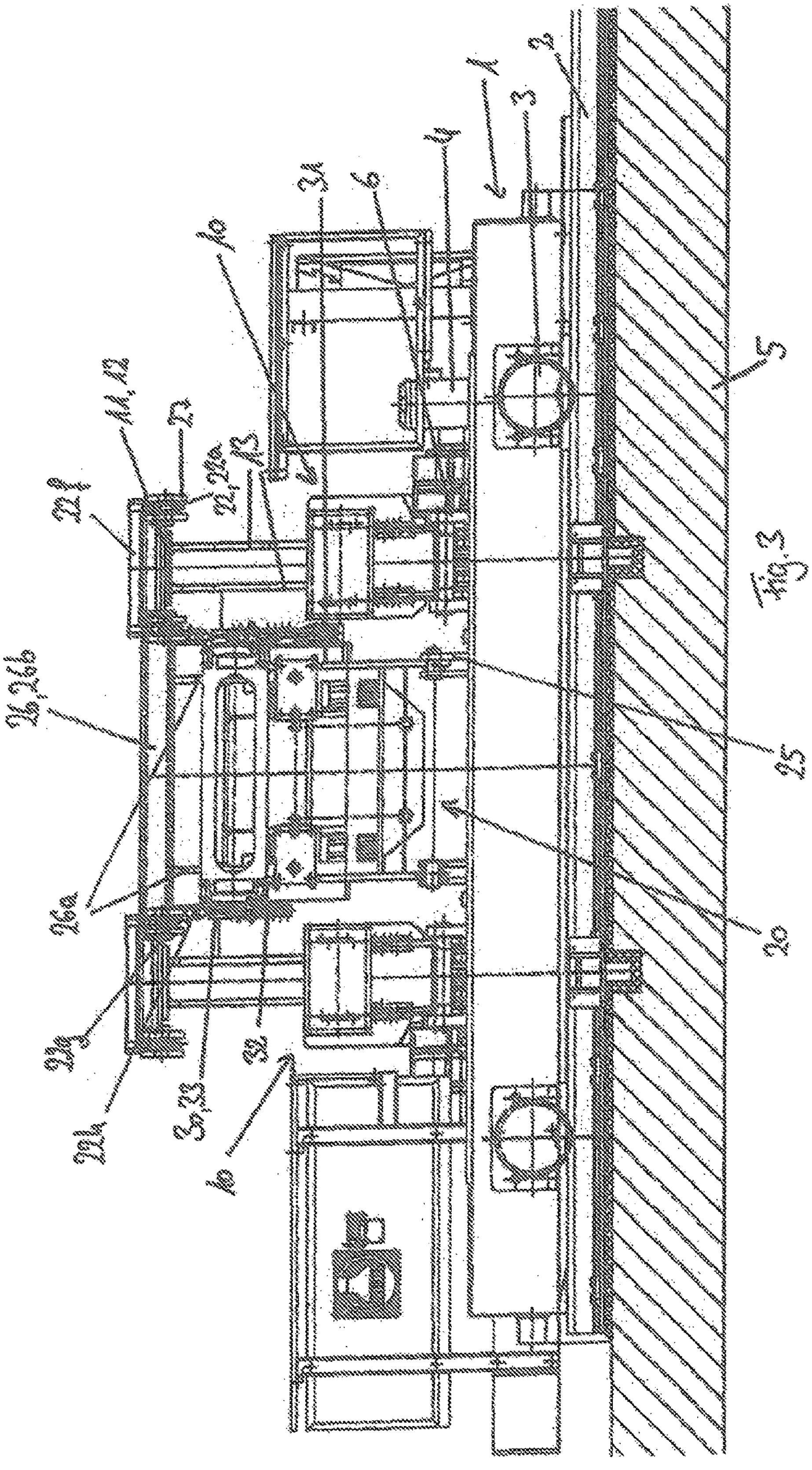
FIG. 3: shows a front view of the transporting apparatus according to FIG. 1.

According to FIG. 3, the transporting apparatus according to the present exemplary embodiment has two tilting frames 10 which each comprise a transporting carriage 11. The tilting frames 10 are arranged parallel to each other and have tilting drives 15 and transporting drives 16, which are each independent of each other. The tilting frames 10 are therefore actuatable independently of each other. The two tilting frames 10 are preferably actuated in a synchronous manner by means of a suitable control. It is also possible for the tilting frames 11 to be connected mechanically to each other, for example by a rigid axle or a rigid transverse member, such that the tilting frames 11 are actuatable synchronously to each other. In this case, a single tilting drive is provided for the two tilting frames 11. It is furthermore possible for the transporting drives 16 to be coupled to one another in such a manner that the two transporting carriages 11 are movable synchronously. Both the coupling by means of a corresponding control, and also a mechanical coupling between the transporting drives, which brings about the synchronous movement of the transporting carriages 11, can be provided here. The transporting carriages 11 can also be coupled mechanically to each other themselves, for example by means of a rigid connection between the transporting carriages 11, such that a synchronous movement of the transporting carriages 11 inevitably arises.

The hook carriage 21 comprises a supporting structure 26 which comprises two chassis members 26*a* and a cross member 26*b*. The cross member 26*b* is fixedly connected, preferably welded, to the chassis members 26*a*. The chassis members 26*a* and the cross member 26*b* together essentially form an I-member-like structure. The chassis members 26*a* engage in the longitudinal guide 23 of the guide frame 20, wherein the chassis members 26*a* preferably form a roller bearing for castors (not illustrated) which are arranged within the longitudinal guide 23, in particular within guide rails (not illustrated) of the longitudinal guide 23. According to the front view in FIG. 3, the cross member 26*b* extends in the transverse direction beyond the transporting carriage 11, in particular beyond the rail sections 12 of the transporting carriages 11. The cross member 26*b* therefore has a width which is greater than the outside distance of the transporting carriages 11.

The hook carriage 21 furthermore comprises at least two, in particular four, in particular eight, hook members 27 which are fixedly connected, in particular welded, to the cross member 26*b*. The hook members 27 extend here from the cross member 26*b* in the direction of the furnace region. The hook members 27 thus form an overhang analogously to the rail member 13 of the transporting carriage 11. Furthermore, the hook members 27 comprise a rotary bearing 27*a*, wherein an axis of rotation 28 of the hook 22 is arranged between each two hook members 27 or two rotary bearings 27*a*. The hook 22 is therefore hingedly connected to the hook member 27 by the rotary bearings 27*a* of the hook members 27.

The hook 22 comprises an extension arm 22*a* which is adapted to project into the furnace when the hook carriage 21 is arranged in the front end position. The extension arm 22*a* has a hook tip 22*b* which substantially has a barb-like shape. The hook tip 22*b* comprises in particular an oblique sliding surface 22*c* which forms an acute angle with a lower surface or edge of the extension arm 22*a*. In interaction with the rotary bearing 27*a*, the sliding surface 22*c* permits tilting of the hook 22 if the hook 22 is driven toward a substantially stationary object in such a manner that the sliding surface 22*c* slides along the object, as a result of which the hook 22, in particular the extension arm 22*a*, is tilted downwards about the axis of rotation 28. The hook tip 22*b* furthermore comprises a front stop 22*d* which is arranged opposite the sliding surface 22*c* and limits the barb-like shape of the hook tip 22*b*. During use, the front stop 22*d* comes into engagement with an ingot rest 40, and therefore the ingot rest 40 can be pulled out of the furnace. Furthermore, the extension arm 22*a* comprises a rear stop 22*e* which is adapted for applying to an ingot rest 40 and for pushing the ingot rest 40 forward. The front and rear stops 22*d*, 22*e* are arranged substantially at right angles to the longitudinal extent of the extension arm 22*a*.

The hook 22 has a lever arm 22*f* as a type of counter element or counter weight with respect to the extension arm 22*a*, wherein the lever arm 22*f*, starting from the axis of rotation 28, points away from the furnace region, i.e. rearward. The lever arm 22*f* is oriented substantially parallel to the extension arm 22*a*, wherein the lever arm 22*f* is arranged higher than the extension arm 22*a*. This means that the lever arm 22*f* is formed essentially above the axis of rotation 28. As can be seen in FIG. 3, the lever arm 22*f* engages in the transverse direction over the transporting carriage 11 or the rail section 12 and forms a connection between two extension arms 22*a* or hooks 22 arranged parallel to each other. An inner lever arm 22*f*, i.e. a lever arm 22*f* facing the chassis member 26*a* or the longitudinal guide 23 furthermore comprises a finger 22*g* which extends vertically downward in the direction of the traveling carriage 1. The finger 22*g* has a rotatably mounted roller 22*h* which, during operation, interacts with a lifter 30 (explained in more detail below) for tilting the hook 22.

Figure 2:
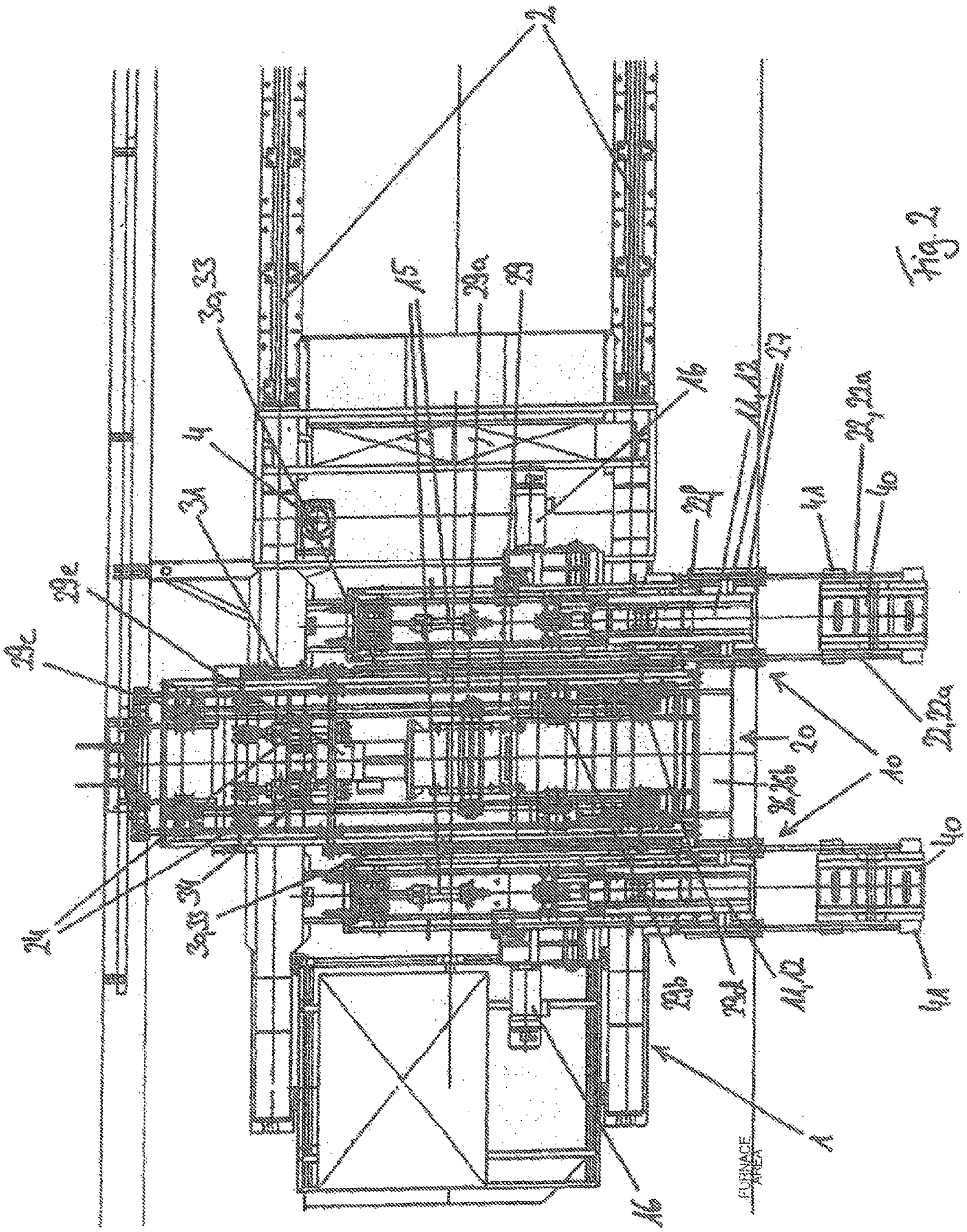
FIG. 2: shows a top view of the transporting apparatus according to FIG. 1.

The lifter 30 is coupled to the guide frame 20 via a link arrangement 32. The lifter 30 comprises two lifting rails 33 which are arranged on either side of the guide frame 20, as can be seen in FIGS. 2 and 3. The lifting rails 33 are in each case hingedly connected to a link arrangement 32, wherein the link arrangement 32 forms a kinematic chain between the lifting rail 33 and a lifting drive 31. It can be seen according to FIG. 2 that the lifter 30 has a common lifting drive 31 which is directly coupled to the link arrangement 32. The link arrangement 32 is connected to a further link arrangement 32 by a cardan shaft 34, and therefore the lifting drive 31 acts on the two link arrangements 32 and therefore on the two lifting rails 33. Analogously to the tilting drive 15, the lifting drive 31 can have a translatory drive, in particular a linear drive or a lifting cylinder, for example a hydraulic cylinder. The lifting rail 33 extends in the longitudinal direction of the guide frame 22, wherein the lifting rail 33 has a longitudinal extent which substantially corresponds to the longitudinal extent of the tilting frame 10. The lifting rail 33 furthermore comprises a front end 33*a* and a rear end 33*b*, wherein the front and the rear ends 33*a*, 33*b* each form an oblique sliding surface. It is therefore ensured that, during the movement of the hook carriage 21 in a movement range corresponding to the longitudinal extent of the tilting frame 10, the roller 22*h* of the hook 22 is basically arranged above or on the lifting rail 33.

The operation of the transporting apparatus or of the ingot carriage is explained in more detail below with reference to the sequence of operations illustrated in FIGS. 4 to 14:

It is advantageous if the transporting apparatus is connected in terms of signal via a corresponding control or regulating unit to the control of the ingot furnace or of a plurality of ingot furnaces. The cycle steps of the transporting apparatus that are explained below are therefore preferably determined in accordance with the overall operating sequences within a system which comprises ingot pusher furnaces and a rolling mill feed, between which the transporting apparatus operates.

Figure 4:
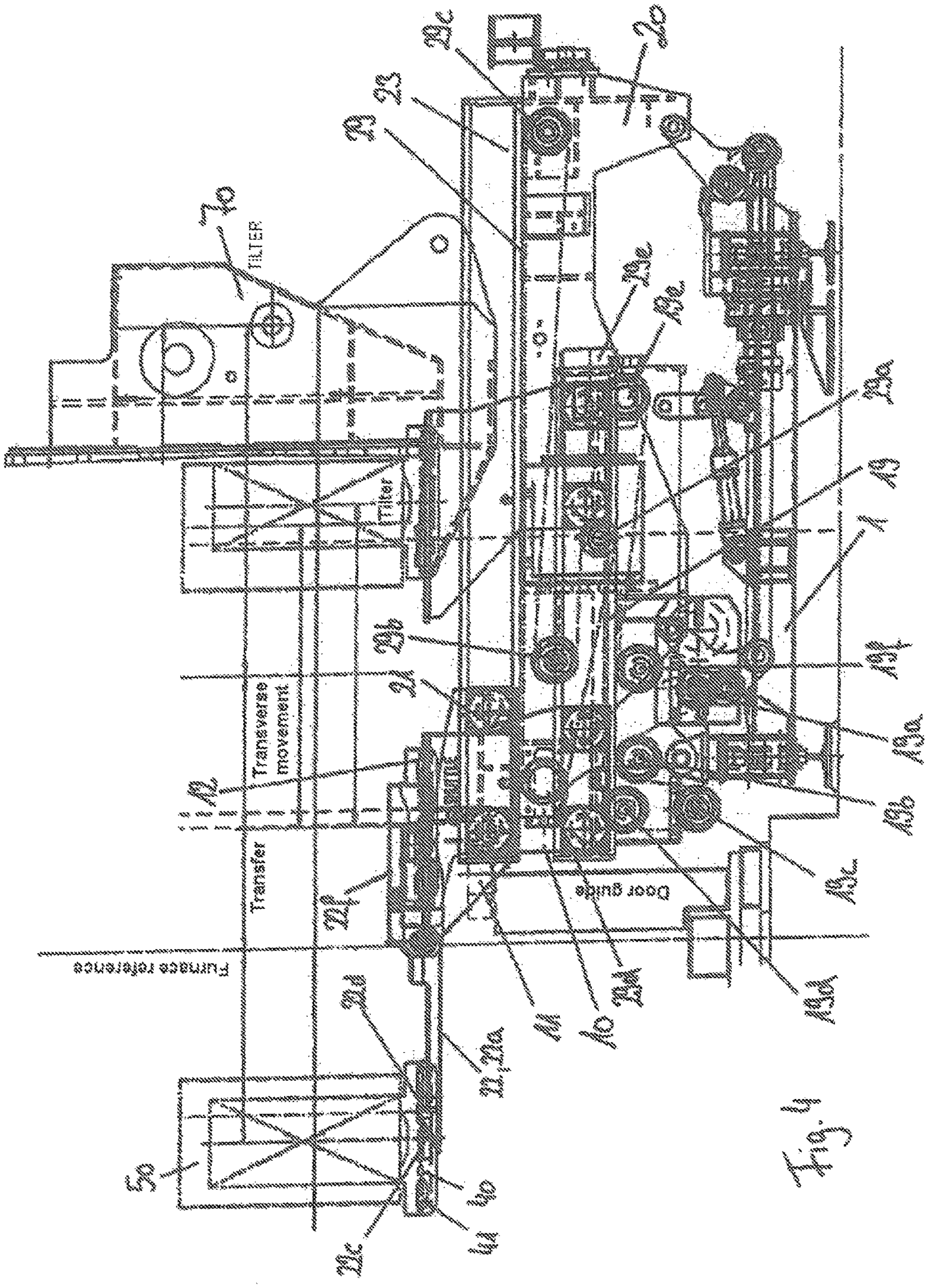
FIGS. 4 to 14: show a side view of the transporting apparatus according to FIG. 1 in different method steps during the transport of rolling ingots.

If an ingot pusher furnace is ready for discharging a heated-up and homogenized rolling ingot 60, a corresponding signal to the transporting apparatus causes the transporting apparatus, in particular the traveling carriage 1, to be positioned in front of the relevant furnace by actuation of the travel drive 4. The transporting carriage 11 is driven into the front end position in the transporting carriage guide 18 of the tilting frame such that the transporting carriage 11 is positioned directly in front of the open furnace, as illustrated in FIG. 4. The height of the rail section 12 of the transporting carriage 11 is dimensioned here in such a manner that the rail section 12 forms an extension of a furnace rail (not illustrated).

The rails which are laid in the furnace and on which the ingot rests 40 are pushed through the furnace are therefore extended by the rail sections 12 of the transporting carriages 11. In the first method step, the hook carriage 21 is likewise driven into the front end position, and therefore the hook 21, in particular the extension arm 22*a*, engages in the furnace. During the forward movement of the hook carriage 21 into the furnace, the hook tip 22*b* is driven toward the ingot rest 40, in particular toward a lateral projection 41 of the ingot rest 40, and therefore the sliding surface 22*c* slides obliquely downward along the projection 41 and causes the hook 22 to tilt. As soon as the hook tip 22*b* has passed the projection 41, the hook 22 tilts back into the inoperative position, and therefore, when the hook carriage 21 is driven back in the direction of the rear end position, the front stop 22*d* enters into engagement with the projection 41 and the ingot rest 40 is thereby pulled onto the transporting carriage 11, in particular the rail sections 12.

It is pointed out in this connection that in each case two hooks 22, as can be seen in FIG. 2, form a pair of hooks, wherein the distance between the hooks 22 of a pair of hooks is selected in such a manner that the hooks 22 are in each case arrangeable laterally on an ingot rest 40, and each of the hooks 22 enters into engagement with a lateral projection 41 of the ingot rest 40.

The transporting carriage 11 and the hook carriage 21 are preferably actuated or moved by belt or chain drives. The belt drive of the hook carriage 21 is illustrated by a thicker chain-dotted line in each of FIGS. 4 to 14 and the belt drive of the transporting carriage 11 by a thinner chain-dotted line.

The hook carriage 21 is driven by a first belt 29 which is connected to a driving pinion 29*a*. The first belt 29 furthermore runs over three further pinions 29*b*, 29*c*, 29*d*. Two first guide pinions 29*c*, 29*d* are arranged spaced apart from each other in the longitudinal direction of the guide frame 20 in such a manner that the belt 29 between said two pinions 29*c*, 29*d* forms a substantially horizontal course along which the hook carriage 21 is movable. For this purpose, the hook carriage 21 is fixedly connected to the belt 29. The driving pinion 29*a* is furthermore coupled to a hook drive 29*e* which is arranged substantially centrally in the guide frame 20, as illustrated in FIG. 2. As is furthermore apparent from FIG. 2, the hook carriage 21 has two belt drives which are coupled to the common hook drive 29*e*.

The belt drive of the transporting carriage 11 is similarly constructed. In particular, the belt drive of the transporting carriage 11 has a second belt 19 which is connected to a motor pinion 19*a*. The second belt 19 runs over a plurality of further pinions 19*b*, 19*c*, 19*d*, 19*e*, wherein two of the further pinions 19*d*, 19*e* are arranged spaced apart on the tilting frame 10 in such a manner that the second belt 19 stretches substantially horizontally between pinions 19*d*, 19*e*. The length of the belt stretched between the pinions 19*d*, 19*e* is adapted in such a manner that the transporting carriage 11 is movable from the front end position as far as the rear end position along the transporting carriage guide 18 of the tilting frame 10. For this purpose, the transporting carriage 11 is fixedly connected to the second belt 19. By means of the belt arrangements or belt drives of the hook carriage 21 and of the transporting carriage 11, the rotational movements of the transporting drive 16 or of the hook drive 29*e* are in each case converted into a translatory longitudinal movement which leads to a movement of the transporting carriage 11 or of the hook carriage 21.

Figure 5:
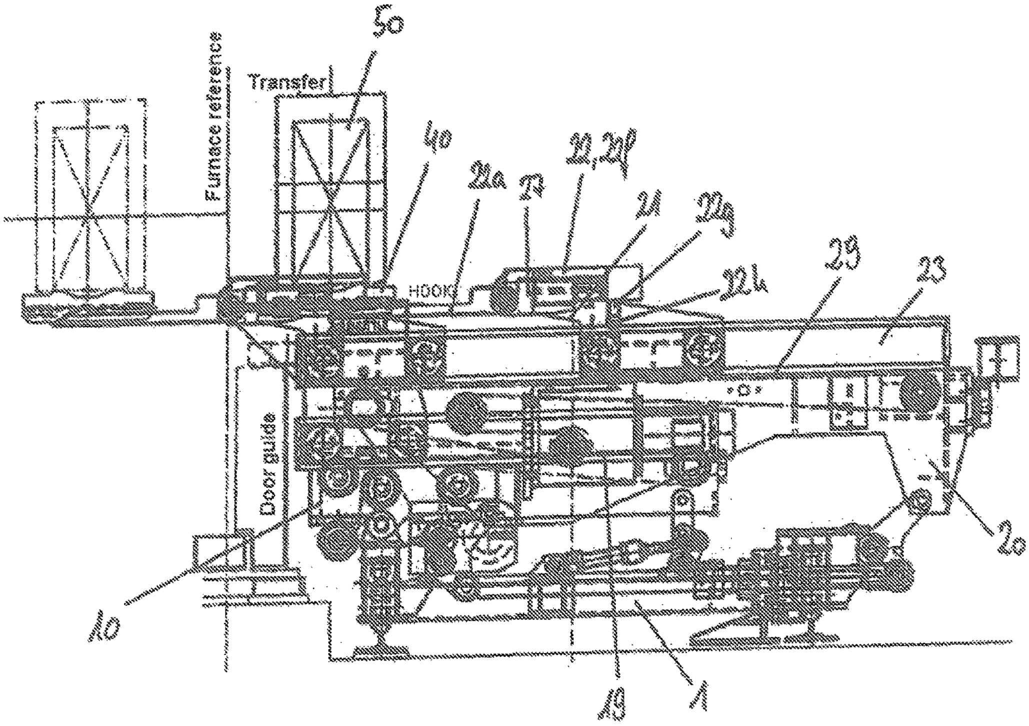

In the second method step, the hook carriage 21, which is coupled to the ingot rest 40 by the hook 22, is moved by the first belt 29 or the hook drive 29*e* along the longitudinal guide 23 of the guide frame 20 in the direction of the rear end position such that the ingot rest 40 is pulled onto the rail section 12 of the transporting carriage 11. As soon as the ingot rest 40 is arranged on the rail section 12, the movement of the hook carriage 21 is stopped (FIG. 5).

Figure 6:
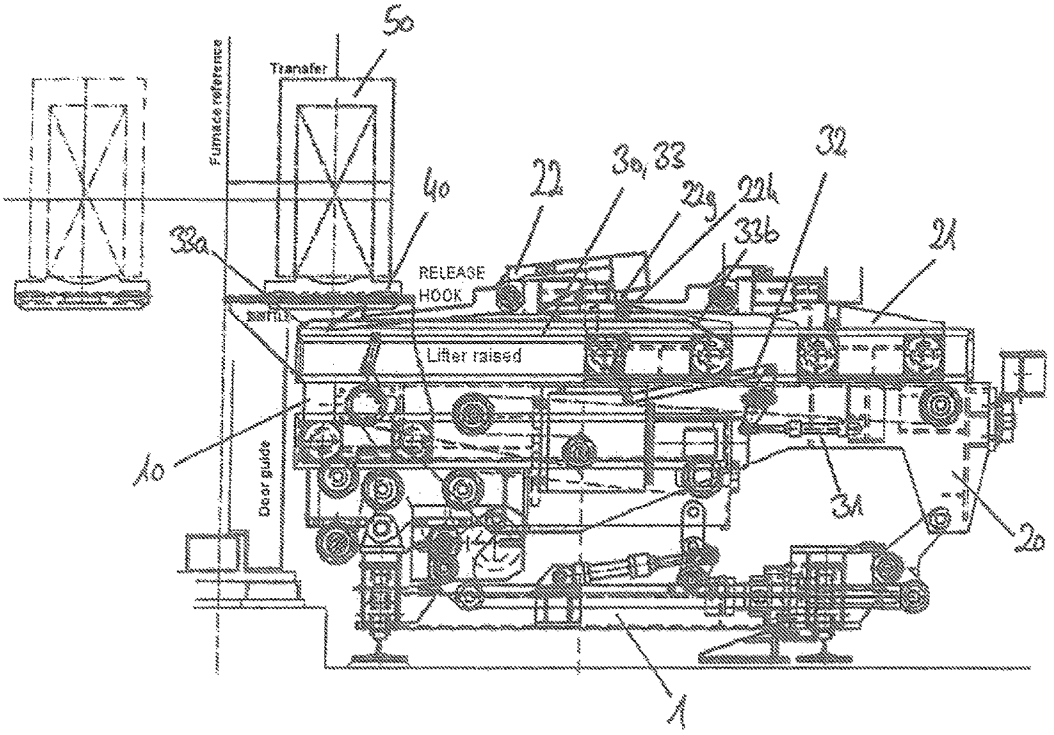

The lifter 30 is used below in order to release the hook 22 from the ingot rest 40, as illustrated in FIG. 6. For this purpose, the kinematic chain formed by the link arrangement 32 is actuated via the lifting drive 31, thus resulting in the lifter 30 being raised. The lifter 30 here lifts the roller 22*h* or the finger 22*g* and therefore the lever arm 22*f* upward, as a result of which the hook tip 22*b* is lowered because of the axis of rotation 28. The engagement of the hook 22 in the ingot rest 40 or the lateral projection 41 of the ingot rest 40 is released. The lifter 30 remains raised, with the hook carriage 21 being moved at the same time further in the direction of the rear end position. The effect achieved by the roller 22*h* and the lifting rail 33 is that the hook 22 remains in the tilted position, at least until the hook 22 is arranged at a distance from the ingot rest 40 or transporting carriage 11. As soon as the finger 22*g* or the roller 22*h* slides downward from the lifter 30, the hook 22 tilts back into the inoperative position in which the extension arm 22*a* is oriented substantially horizontally.

In the previously described three first method steps or cycle steps, the guide frame 20 is arranged in a raised position. This means that the guide frame 20 is driven by the raising drive 24 into the upper end position.

Figure 7:
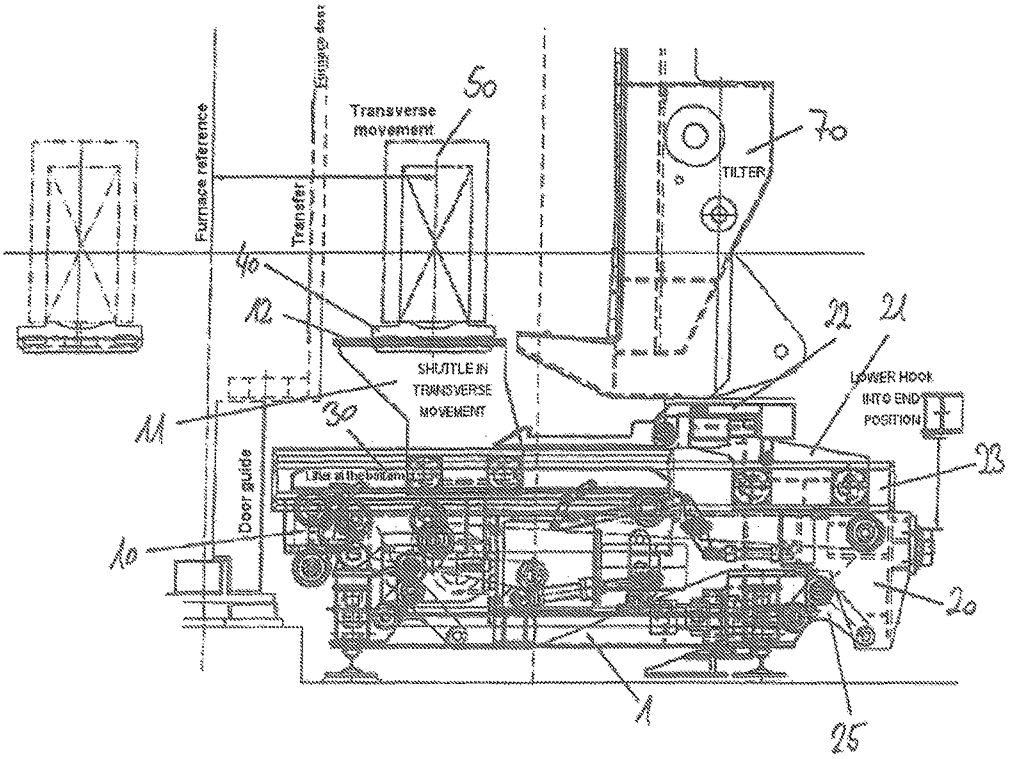

In the following step, which is illustrated in FIG. 7, the guide frame 20 is lowered or driven into a lower end position. For this purpose, the raising drive 24 is actuated, as a result of which the raising joint 25 rotates about the fourth rotary joint 25*b* and brings about the lowering of the guide frame 20. Furthermore, in the fourth method step or cycle step, the traveling carriage 1 is actuated in order to move the transporting apparatus to a tilting apparatus 70. For the further method steps, it is therefore expedient to position the transporting apparatus in front of a tilting apparatus 70. In FIGS. 7 to 13, the tilting apparatus 70 is illustrated as a tipper in the manner of a hook or shovel. The tilting apparatus 70 preferably serves to deposit the rolling ingot 50 onto a rolling mill or rolling mill feed.

In order to feed the rolling ingot 50 to the tilting apparatus 70, the transporting carriage 11 is moved by the corresponding belt drive, in particular the second belt 19, in the direction of the rear end position. In this method step, the transporting carriage 11 is preferably positioned substantially centrally with respect to the transporting carriage guide 18 such that there is sufficient free space laterally around the transporting carriage 11 for the transfer of the rolling ingot 50 to the tilting apparatus 70. The transporting carriage 11 is therefore also removed from the furnace, and therefore the furnace door can be closed.

Figure 8:
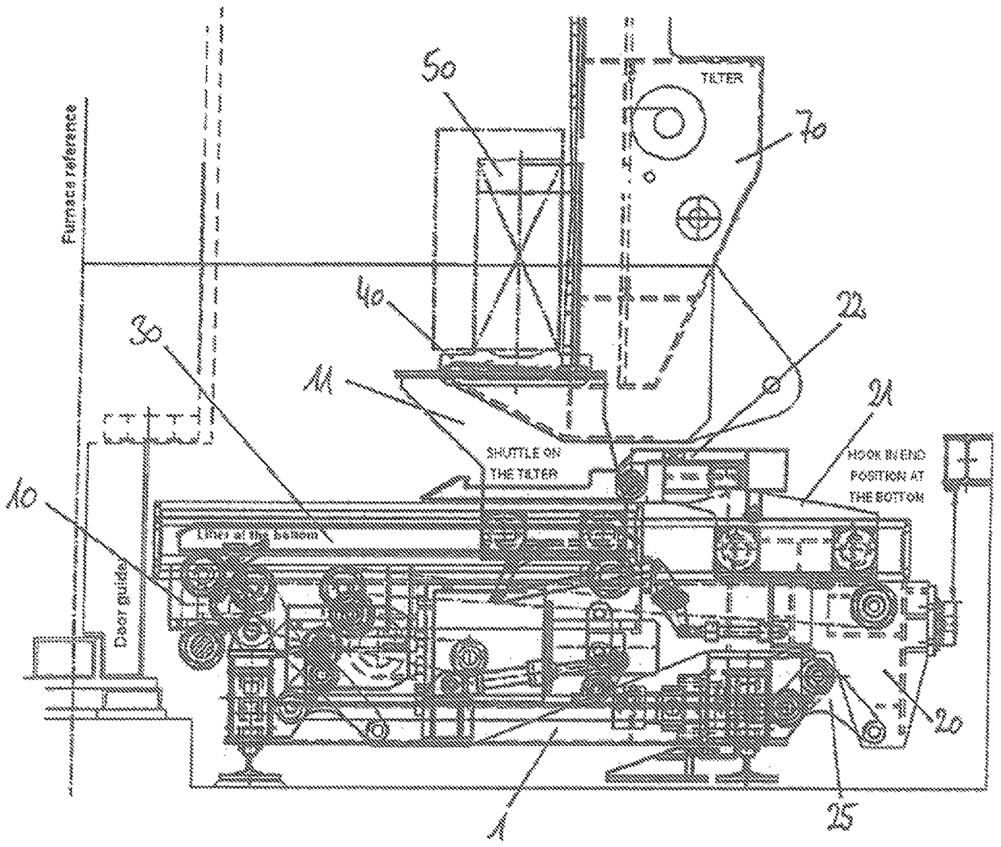

In the next method step according to FIG. 8, the rolling ingot 50 is transferred from the transporting carriage 11 to the tilting apparatus 70. For this purpose, the transporting carriage 11 is driven further in the direction of the tilting apparatus 70, in particular into the rear end position of the transporting carriage guide 18. The tilting apparatus 70 engages here between the two transporting carriages 11, which are arranged parallel to each other, as illustrated in FIG. 2. In this connection, it is expressly pointed out that it is particularly expedient if the transporting carriages 11 are actuatable or activatable synchronously.

Figure 9:
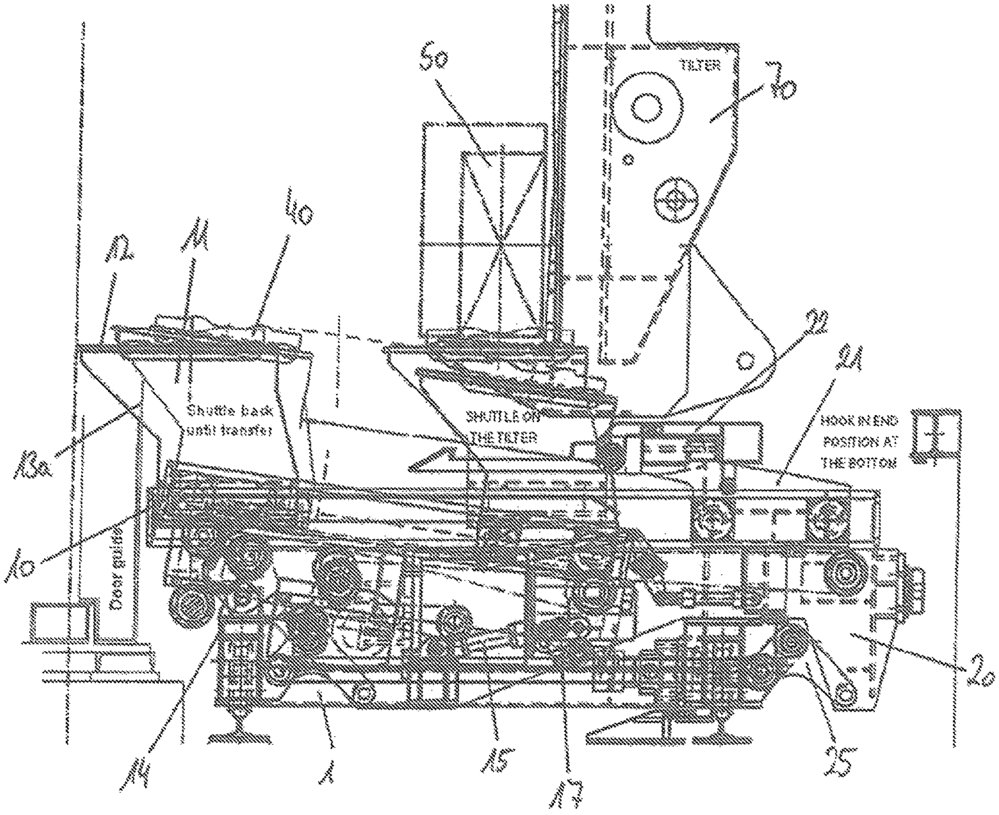

The transfer of the rolling ingot 50 onto the tilting apparatus 70 is illustrated in FIG. 9. In this method step, the tilting frame 10 is tipped by actuation of the tilting drive 15, wherein the tilting frame 10 rotates about the tilting axis 14. By actuation of the tilting drive 15, the tilting joint 17 in particular rotates about the first rotary joint 17*a*, as a result of which tilting of the tilting frame 10 is brought about. By means of the tilting movement of the tilting frame 10, the rolling ingot 50 is deposited onto the tilting apparatus 70, with the ingot rests 40 being retained on the transporting carriage 11. The tilting frame 10 initially remains in the tilted position, wherein the transporting carriage 11 is moved back into the front end position or the takeover position.

Figure 10:
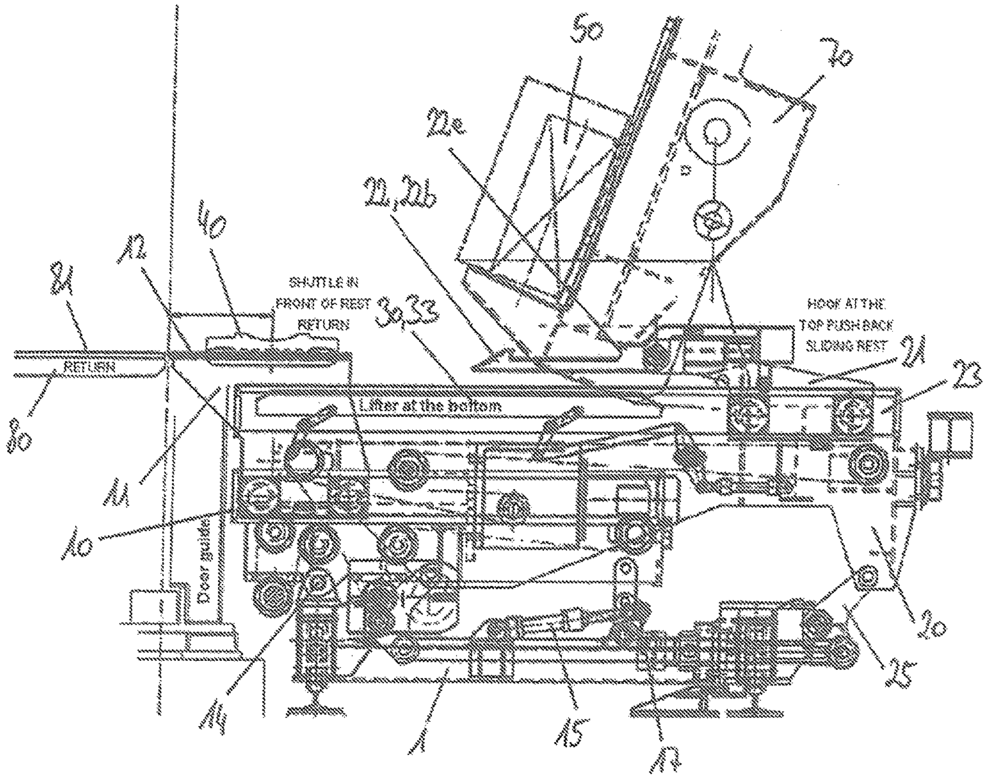

In the next cycle step according to FIG. 10, the tilting apparatus 70 is tipped or pivoted in order to bring the rolling ingot 50, which is received on edge, into a substantially horizontal position and to deposit same with a flat side onto a rolling mill or a rolling mill feed. In the meanwhile, the traveling carriage 1 is positioned in front of an ingot rest return 80, wherein the guide frame 20 is raised into the upper end position by the raising drive 24. The transporting carriage 11 is driven forward into the front end position such that the rail sections 12 form a common, extended guide for the ingot rests 40 with return rails 81 of the ingot rest return 80.

Figure 11:
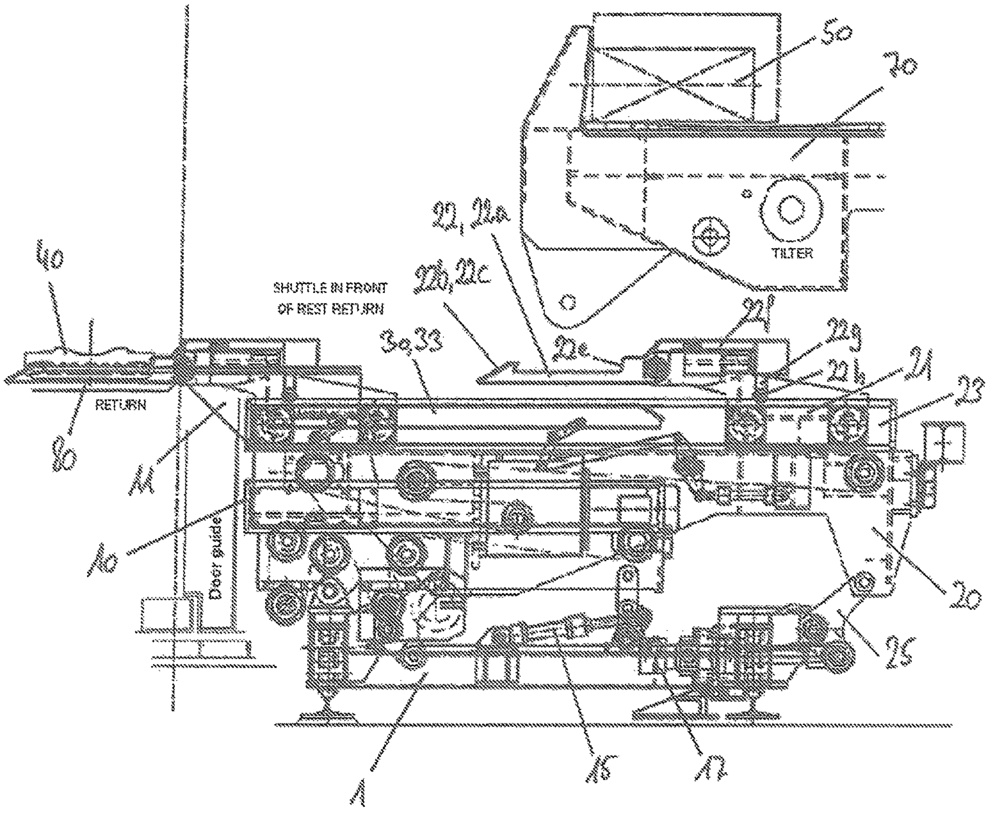

As illustrated in FIG. 11, the hook carriage 21 is likewise moved into the front end position, wherein the hook engages or hooks into the ingot rest 40 which is arranged on the transporting carriage 11. As already happens during the gripping of the ingot rest 40 in the furnace, the hook 22 hooks in substantially automatically also during the gripping of the ingot rest 40 on the transporting carriage 11 by the sliding surface 22*c* of the hook tip 22*b* sliding along the projection 41 of the ingot rest 40 and triggering the tilting movement of the hook 22. During this operation, the rear stop 22*e* of the extension arm 22*a*, which is part of the hook 22, enters into contact with the lateral projection 41 of the ingot rest 40 such that, during the further movement forward of the hook carriage 21, the ingot rest 40 is pushed from the rail section 12 of the transporting carriage 11 onto the return rail 81 of the ingot rest return 80.

Figure 12:
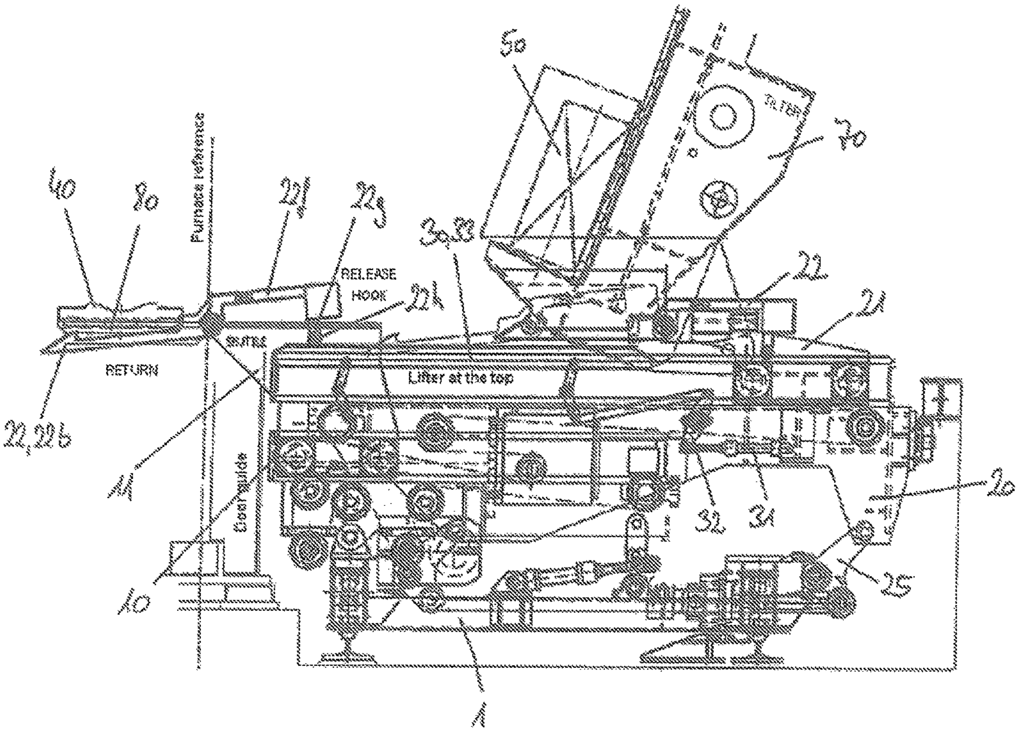

As soon as the ingot rest 40 is arranged in the ingot rest return 80, the lifter 30 is actuated, as illustrated in FIG. 12, in order to release the hook 22 from the ingot rest 40. The extension arm 30 is actuated analogously to the previously described method step, in which the hook 22 is released from the ingot rest 40 after the ingot rest 40 is pulled out of the furnace. The hook carriage 21 is correspondingly moved back, wherein the hook 22 remains in the tilted position because of the raised lifter 30 until the hook carriage 21 is removed from the ingot rest return 80 to such an extent that the roller 22*h* or the finger 22*g* slides downward from the lifting rail 33 and therefore releases the automatic resetting of the hook 22 into the inoperative position. The hook carriage 21 is preferably moved into the rear end position.

Figure 13:
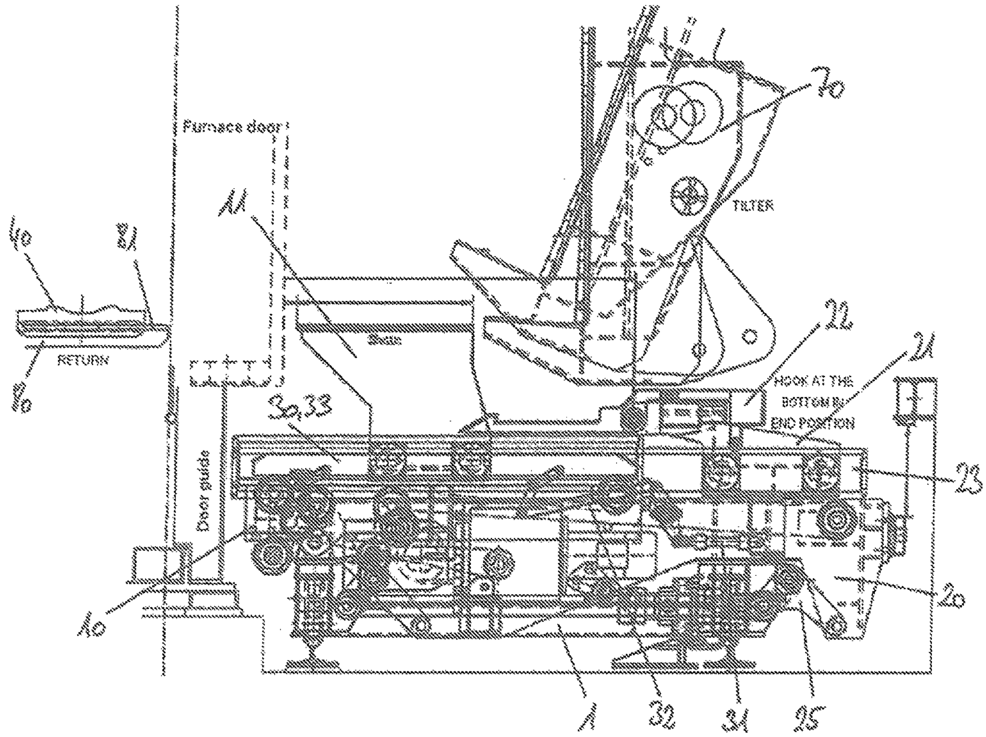
Figure 14:
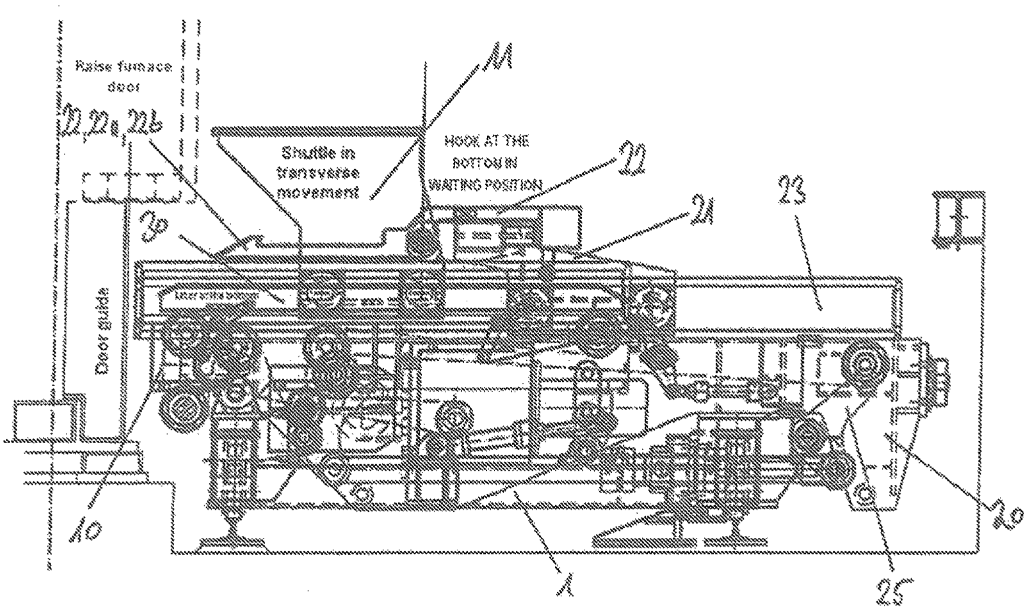

As illustrated in FIG. 13, in a next step, the guide frame 20 is lowered onto the lower end position. Furthermore, the transporting carriage 11 is moved back, preferably approximately into the center of the transporting carriage guide 18. The hook carriage 21 is furthermore in the rear end position. In this configuration, the movement of the traveling carriage 1 between the furnaces or between a furnace and the tilting apparatus 70 is permitted. In this configuration, the traveling carriage 1 is preferably actuated in order to position the transporting apparatus in front of a furnace which outputs the next heated and homogenized rolling ingot 50.

As soon as the traveling carriage 1 or the transporting apparatus is positioned in front of the furnace which outputs the next rolling ingot 50, the transporting apparatus is brought into the basic position for the next cycle sequence. For this purpose, the hook carriage 21 is driven into the waiting position. The waiting position of the hook carriage 21 is reached, according to FIG. 14, if the extension arm 22*a* of the hook 22 is arranged substantially to the side of the transporting carriage 11 or below the rail section 12. In the basic position, the guide frame 20 is preferably arranged in the lower end position, i.e. in the lowered position. As soon as the furnace is ready for outputting the next rolling ingot 50, the furnace door is opened and at the same time the guide frame 20 is raised in order, firstly, to position the transporting carriages 11 onto the furnace rails and, secondly, to drive the hook 22 or the extension arm 22*a* into the furnace and to pull out the rolling ingot 50 with the aid of the ingot rests 40, as illustrated in FIG. 4.

The transporting apparatus or the ingot carriage therefore has the following core functions:

- transporting rolling ingots 50 and sliding rests or ingot rests 40;
- extending the furnace rails mounted in the interior of the furnace by means of the transporting carriage 11, which serves as a mobile rail section and as an intermediate storage space for the pulled-out rolling ingot 50;
- pulling the rolling ingot 50 out of the furnace interior with the aid of the hook carriage 21;
- transferring the rolling ingot 50 onto the tilting apparatus 70 by lowering or tilting the tilting frame 10 on one side;
- transferring the empty sliding rests or ingot rests onto the ingot rest return 80;
- absorbing static and dynamic forces and torques during the manipulation at the rolling ingots;
- positioning and arresting the traveling carriage 1 or in general the transporting apparatus; and
- synchronized moving of the transporting carriages 11.

In order to position and arrest the transporting apparatus or the ingot carriage, the traveling carriage 1 preferably has corresponding devices, for example brakes. Furthermore, it is advantageous if the transporting apparatus comprises heat or spurt protection shields which minimize the thermal effects on the mechanical and electrical components. The heat and spurt protection shields are preferably arranged in the front region, i.e. on the furnace side, of the transporting apparatus. For example, spurt protection shields or heat protection shields can be assigned to the tilting frame, the guide frame and the traveling carriage on the furnace side.

LIST OF REFERENCE NUMBERS

1 Traveling carriage
2 Running rail
3 Wheel
4 Travel drive
5 Foundation
6 Tilting axis bearing
10 Tilting frame
11 Transporting carriage
12 Rail section
13 Rail member
13*a* Overhang
14 Tilting axis
15 Tilting drive
16 Transporting drive
17 Tilting joint
17*a* First rotary joint
17*b* Second rotary joint
18 Transporting carriage guide
19 Second belt
19*a* Motor pinion
19*b*,19*c*,19*d*,19*e* Further pinions
20 Guide frame
21 Hook carriage
22 Hook
22*a* Extension arm
22*b* Hook point
22*c* Sliding surface
22*d* Front stop
22*e* Rear stop
22*f* Lever arm
22*g* Finger
22*h* Roller
23 Longitudinal guide

24 Raising drive
25 Raising joint
25*a* Third rotary joint
25*b* Fourth rotary joint
26 Supporting structure
26*a* Chassis member
26*b* Cross member
27 Hook member
27*a* Rotary bearing
28 Axis of rotation
29 First belt
29*a* Driving pinion
29*b*,29*c*,29*d* Further pinions
29*e* Hook drive
30 Lifter
31 Lifting drive
32 Link arrangement
33 Lifting rail
33*a* Front end
33*b* Rear end
34 Cardan shaft
40 Ingot rest
41 Projection
50 Rolling ingot
70 Tilting apparatus
80 Ingot rest return
81 Return rail

What is claimed is:

1. A transporting apparatus for a rolling ingot, the transporting apparatus comprising:
- a traveling carriage comprising a first tilting frame and a guide frame,
  - the first tilting frame comprising a first transporting carriage, the first transporting carriage being longitudinally displaceably moveable and comprising a rail section for receiving an ingot rest, the rail section being positioned collinearly with respect to a furnace rail, the rail section forming a rail extension to the furnace rail; and
- the guide frame comprising a hook carriage, the hook carriage moving substantially parallel to the first transporting carriage and comprising a tiltable hook for engaging in the ingot rest;
- wherein the first tilting frame tilts parallel to a direction of movement of the traveling carriage.

2. The transporting apparatus as claimed in claim 1, wherein the first transporting carriage is moveable transversely with respect to a direction of movement of the traveling carriage.

3. The transporting apparatus as claimed in claim 1, wherein the hook carriage or the first transporting carriage comprises an electric drive.

4. The transporting apparatus as claimed claim 1, wherein the traveling carriage is moveable on running rails, the running rails being arranged transversely to a furnace pass through direction.

5. The transporting apparatus as claimed in claim 1, wherein the traveling carriage comprises a second tilting frame, the first tilting frame and the second tilting frame being arranged on either side of the guide frame, the second tilting frame comprising a second transporting carriage.

6. The transporting apparatus as claimed in claim 5, wherein the first transporting carriage and the second transporting carriage move synchronously to each other.

7. The transporting apparatus as claimed in claim 5, wherein the guide frame has a longitudinal guide for the hook carriage, the longitudinal guide extends parallel to at least the first transporting carriage and the second transport carriage.

8. The transporting apparatus as claimed in claim 1, further comprising a heat shield or a spurt protection shield, the heat shield or the spurt protection shield being disposed on the first tilting frame, the first transporting carriage, or the guide frame.

9. The transporting apparatus as claimed in claim 1, wherein the rolling ingot is transported between a pusher furnace and a tipping apparatus.

10. A transporting apparatus for a rolling, ingot, the transporting, apparatus comprising:
- a traveling carriage comprising a first tilting frame and a guide frame,
  - the first tilting frame comprising a first transporting carriage, the first transporting carriage being longitudinally displaceably moveable and comprising a rail section for receiving an ingot rest, the rail section being positioned collinearly with respect to a furnace rail, the rail section forming a rail extension to the furnace rail; and
- the guide frame comprising a hook carriage, the hook carriage moving substantially parallel to the first transporting carriage and comprising a tiltable hook for engaging in the ingot rest;
- wherein the guide frame is height-adjustable.

11. The transporting apparatus as claimed in claim 10, wherein the first transporting carriage is moveable transversely with respect to a direction of movement of the traveling carriage.

12. The transporting apparatus as claimed claim 10, wherein the traveling carriage is moveable on running rails, the running rails being arranged transversely to a furnace pass through direction.

13. The transporting apparatus as claimed in claim 10, wherein the traveling carriage comprises a second tilting frame, the first tilting frame and the second tilting frame being arranged on either side of the guide frame, the second tilting frame comprising a second transporting carriage.

14. The transporting apparatus as claimed in claim 13, wherein the first transporting carriage and the second transporting carriage move synchronously to each other.

15. The transporting apparatus as claimed in claim 13, wherein the guide frame has a longitudinal guide for the hook carriage, the longitudinal guide extends parallel to at least the first transporting carriage and the second transport carriage.

16. The transporting apparatus as claimed in claim 10, wherein the rolling ingot is transported between a pusher furnace and a tipping apparatus.

17. A transporting apparatus for a rolling ingot, the transporting apparatus comprising:
- a traveling carriage comprising a first tilting frame and a guide frame,
  - the first tilting frame comprising a first transporting carriage, the first transporting carriage being longitudinally displaceably moveable and comprising a rail second for receiving an ingot rest, the rail section being positioned collinearly with respect to a furnace rail, the rail section forming a rail extension to the furnace rail; and
- the guide frame comprising a hook carriage, the hook carriage moving substantially parallel to the first transporting carriage and comprising a tiltable hook for engaging in the ingot rest;

wherein the guide frame comprises a lifter, the lifter being height-adjustable with respect to the guide frame and interacts with a lever arm of the hook to tilt the hook about an axis of rotation.

18. The transporting apparatus as claimed in claim 17, wherein the first transporting carriage is moveable transversely with respect to a direction of movement of the traveling carriage.

19. A method for transporting a rolling ingot between a furnace and a rolling mill using a transporting apparatus, the transporting apparatus comprising a traveling carriage comprising a tilting frame and a guide frame, the tilting frame comprising a transporting carriage, the transporting carriage being longitudinally displaceably moveable and comprising a rail section for receiving an ingot rest, the rail section being positioned collinearly with respect to a furnace rail, the rail section forming a rail extension to the furnace rail; and the guide frame comprising a hook carriage, the hook carriage moving substantially parallel to the transporting carriage and comprising a tiltable hook for engaging in the ingot rest;

the method comprising the steps of:

providing the transporting apparatus, extending the furnace rail, positioning the rail section collinearly and flush to the furnace rail, actuating the hook carriage for the hook to grasp an ingot rest and move the ingot rest onto the rail section of the transporting carriage, displacing the transporting carriage longitudinally, tipping the tilting frame, and transferring the rolling ingot onto a tipping apparatus.

20. The method as claimed in claim 19, further comprising the step of actuating the hook carriage for transferring the ingot rest onto an ingot rest return.

* * * * *